United States Patent [19]

Etoh

[11] Patent Number: 4,953,093

[45] Date of Patent: Aug. 28, 1990

[54] SYSTEM AND METHOD FOR AUTOMATICALLY CONTROLLING VEHICLE SPEED TO DESIRED CRUISE SPEED WITH TRACTION CONTROL FUNCTION

[75] Inventor: Yoshiyuki Etoh, Kanagawa, Japan

[73] Assignee: Nissan Motor Company, Limited, Yokohama, Japan

[21] Appl. No.: 261,860

[22] Filed: Oct. 25, 1988

[30] Foreign Application Priority Data

Oct. 27, 1987 [JP] Japan .................................. 62-164501

[51] Int. Cl.$^5$ ............................................. B60K 31/00
[52] U.S. Cl. .............................. 364/426.04; 180/170; 180/197; 364/426.03
[58] Field of Search ....................... 364/426.01–426.04, 364/424.01; 180/197, 170, 176; 123/361, 352; 324/160, 161

[56] References Cited

U.S. PATENT DOCUMENTS

| | | | |
|---|---|---|---|
| 4,615,410 | 10/1986 | Hosaka | 180/197 |
| 4,736,814 | 4/1988 | Yogo et al. | 180/197 |
| 4,763,263 | 8/1988 | Leiber | 364/426.03 |
| 4,809,183 | 2/1989 | Eckert | 364/426.04 |
| 4,811,808 | 3/1989 | Matsumoto et al. | 180/197 |
| 4,814,991 | 7/1987 | Tada et al. | 364/426.04 |
| 4,829,438 | 5/1989 | Etoh | 364/426.04 |
| 4,833,612 | 5/1989 | Okuno et al. | 364/426.04 |

Primary Examiner—Thomas G. Black
Attorney, Agent, or Firm—Foley & Lardner, Schwartz, Jeffery, Schwaab, Mack, Blumenthal & Evans

[57] ABSTRACT

A system and method for automatically controlling a vehicle speed to a desired cruise speed are disclosed in which when a vehicular running resistance is derived on the basis of an engine torque and change rate of the vehicle speed with time, the engine torque being derived on the basis of an engine revolutional speed and engine load, a predetermined factor determining the running resistance is derived on the basis of the running resistance. In addition, an absolute value of a difference of the predetermined factor from a previous predetermined factor derived one predetermined calculation period before is compared with a predetermined threshold value, a zero engine driving force command is outputted to an actuator of an engine driving force adjustng mechanism so that the engine driving force adjusting mechanism is actuated to zero the engine driving force to recover gripping forces of drive wheels when the absolute value of the difference exceeds the predetermined threshold value.

20 Claims, 6 Drawing Sheets

ENGINE TORQUE Te [kgm] TABLE (41)

| Θ(deg)<br>Ne(rpm) | 0 | 2 | 4 | 6 | 8 | 10 | 12 | 14 | 16 | 18 | 20 | 22 | 24 | 26 | 28 | 30 |
|---|---|---|---|---|---|---|---|---|---|---|---|---|---|---|---|---|
| 800 | −2.0 | 3.0 | 5.2 | 6.3 | 7.0 | 7.4 | 7.6 | 7.7 | 7.8 | 7.8 | 7.8 | 7.8 | 7.8 | 7.8 | 7.9 | 7.9 |
| 1200 | −0.2 | 2.0 | 3.7 | 5.0 | 6.0 | 6.7 | 7.3 | 7.7 | 7.9 | 7.9 | 8.0 | 8.0 | 8.0 | 8.0 | 8.0 | 8.0 |
| 1600 | −1.5 | 0.8 | 2.5 | 3.9 | 5.1 | 6.1 | 7.0 | 7.7 | 8.3 | 8.7 | 8.9 | 9.0 | 9.1 | 9.1 | 9.1 | 9.1 |
| 2000 | −1.6 | 0 | 1.6 | 2.9 | 4.2 | 5.3 | 6.2 | 7.2 | 8.0 | 8.6 | 9.0 | 9.2 | 9.4 | 9.4 | 9.4 | 9.5 |
| 2400 | −2.0 | −0.6 | 0.7 | 1.9 | 3.2 | 4.4 | 5.6 | 6.7 | 7.9 | 8.8 | 9.6 | 10.2 | 10.5 | 10.5 | 10.6 | 10.6 |
| 2800 | −2.0 | −1.0 | 0 | 1.0 | 2.3 | 3.7 | 5.1 | 6.5 | 7.9 | 9.1 | 10.0 | 10.4 | 10.4 | 10.5 | 10.5 | 10.6 |
| 3200 | −2.4 | −1.6 | −0.8 | 0.3 | 1.5 | 2.9 | 4.3 | 5.9 | 7.5 | 8.9 | 9.8 | 10.3 | 10.5 | 10.6 | 10.6 | 10.6 |
| 3600 | −3.5 | −2.7 | −1.8 | −0.8 | 0.4 | 1.7 | 3.1 | 4.8 | 6.4 | 7.9 | 9.0 | 9.9 | 10.4 | 10.7 | 11.0 | 11.3 |

FIG. 5

TARGET OPENING ANGLE OF THROTTLE VALVE Θs [deg] TABLE (42)

| Te(kgm)<br>Ñe(rpm) | −4 | −3 | −2 | −1 | 0 | 1 | 2 | 3 | 4 | 5 | 6 | 7 | 8 | 9 | 10 | 11 |
|---|---|---|---|---|---|---|---|---|---|---|---|---|---|---|---|---|
| 800 | 0 | 0 | 0 | 0.2 | 0.5 | 0.9 | 1.4 | 2.0 | 2.7 | 3.7 | 5.2 | 8.0 | 8.0 | 8.0 | 8.0 | 8.0 |
| 1200 | 0 | 0 | 0 | 0 | 0.2 | 1.1 | 2.0 | 3.1 | 4.4 | 6.0 | 8.1 | 11.0 | 18.0 | 18.0 | 18.0 | 18.0 |
| 1600 | 0 | 0 | 0 | 0.4 | 1.2 | 2.2 | 3.4 | 4.7 | 6.2 | 7.9 | 9.8 | 12.0 | 14.9 | 22.0 | 22.0 | 22.0 |
| 2000 | 0 | 0 | 0 | 0.8 | 2.0 | 3.3 | 4.6 | 6.1 | 7.7 | 9.5 | 11.4 | 13.5 | 15.9 | 20.0 | 20.0 | 20.0 |
| 2400 | 0 | 0 | 0 | 1.5 | 3.0 | 4.5 | 6.1 | 7.7 | 9.3 | 10.9 | 12.7 | 14.5 | 16.3 | 18.4 | 21.2 | 21.2 |
| 2800 | 0 | 0 | 0 | 2.0 | 4.1 | 6.0 | 7.5 | 9.0 | 10.4 | 11.8 | 3.3 | 14.7 | 16.1 | 17.8 | 20.0 | 20.0 |
| 3200 | 0 | 0 | 1.0 | 3.5 | 5.4 | 7.2 | 8.7 | 10.1 | 11.5 | 12.8 | 14.1 | 15.3 | 16.6 | 18.1 | 20.6 | 20.6 |
| 3600 | 0 | 1.4 | 3.6 | 5.6 | 7.3 | 9.0 | 10.4 | 11.8 | 13.1 | 14.2 | 15.5 | 16.7 | 18.2 | 19.9 | 22.5 | 25.5 |

SYSTEM AND METHOD FOR AUTOMATICALLY CONTROLLING VEHICLE SPEED TO DESIRED CRUISE SPEED WITH TRACTION CONTROL FUNCTION

BACKGROUND OF THE INVENTION

1. Field of the Invention

The present invention relates to a system and method for automatically controlling a vehicle speed to a desired cruise speed with a traction control function to prevent occurrence of slip on drive wheels of vehicles in which automatic cruise speed controlling systems are mounted.

2. Background of the Art

Various types of automatic cruise speed controlling systems have been proposed.

One of such automatic cruise speed controlling systems is exemplified by a Japanese Patent Application First Publication No. sho 60-4428 published on Jan. 10, 1985.

Other previously proposed automatic cruise speed controlling system are exemplified by two Japanese patent Application First Publications (Unexamined) No. sho 62-261545 published on Nov. 13, 1987 and No. sho 62-286845 published on Dec. 12, 1987 (the latter Japanese Patent Application First Publication No. sho 62-286845 corresponding to a U.S. patent application Ser. No. 057,086 filed on June 3, 1987), now U.S. Pat. No. 4,829,438.

In the latter two Japanese Patent Application First Publications, a microcomputer receives a vehicle speed indicative signal from a vehicle speed sensor when a set/cruise switch is depressed to turn on so that the microcomputer stores the current vehicle speed V as the set cruise speed and starts the automatic cruise speed control. The automatic cruise control is such that an opening angle of an engine throttle valve is adjusted through a throttle actuator so that the current vehicle speed coincides with the set cruise speed without operation of an accelerator pedal.

In addition, a table memory storing an engine torque (Te) data and another table memory storing a target opening angle ($\theta_s$) of the throttle valve are provided. The microcomputer reads a current opening angle ($\theta$) of the throttle valve from an opening angle sensor for detecting the current opening angle of the throttle valve and an engine speed (Ne) from a crank angle sensor and reads the engine torque (Te) from the table memory on the basis of the read opening angle ($\theta$) of the throttle valve and read engine speed (Ne). Then, the microcomputer reads the target opening angle ($\theta_s$) from an estimated running resistance (D) based on the read engine torque (Te) and the set cruise speed ($V_s$). Then, the microcomputer issues a throttle valve actuate instruction to the throttle actuator so that the opening angle of the throttle valve ($\theta$) coincides with the target opening angle ($\theta_s$).

Thus, since the instantaneous running resistance is estimated with reference to the data on the engine performance and vehicle operation and an operating variable for the actuator is determined on the basis of an estimated value of the running resistance, a stable vehicle comfortability can be assured even if conditions of road on which the vehicle runs change.

However, since in such a previously proposed automatic cruise speed controlling system a speed of drive wheels (rear tire wheels in a case of front-wheel rear-drive vehicles) is adopted as the vehicle speed, the speed of the drive wheels does not coincide with the true vehicle speed (vehicle body speed) when the vehicle runs on a low frictional resistance road such as a road covered with snow or on a frozen road.

Suppose that the vehicle enters during the automatic cruise control operation on a road having a gradient of 3 percent and having a low friction coefficient (for example, $\mu = 0.1$) (hereinafter, such a road is referred to as a low frictional road).

At this time, a slip occurs on the drive wheels during an interval of time for which the vehicle runs on the frictional road (time is between 10 seconds and 30 seconds) and a vehicle body speed ($V_{CAR}$) is reduced. However, the drive wheel speed ($V_w$) is maintained at the cruise speed so that a slip rate is increased. Consequently, a steering force and a cornering force during a steering wheel operation are lost.

Hence, it is necessary to give a priority higher than the automatic cruise speed control to prevention of occurrence of slips on the drive wheels.

SUMMARY OF THE INVENTION

It is an object of the present invention to provide a system and method for automatically controlling a vehicle speed to a desired cruise speed which assures vehicle stability during operation of a vehicle in which the system is running on a low frictional road without occurrence of slip.

The above-described object can be achieved by providing a system for automatically controlling a vehicle speed to a desired cruise speed, comprising: (a) first means for detecting a current vehicle speed; (b) second means through which the current vehicle speed is settable to a cruise speed at which the vehicle is desired to cruise; (c) third means responsive to the cruise speed set through the second means for producing a speed control command to control an engine driving force generated by a vehicular engine so that the current vehicle speed coincides with the set cruise speed; (d) fourth means responsive to the speed control command from the third means for actuating an engine driving force adjusting mechanism; (e) fifth means for detecting an engine revolutional speed; (f) sixth means for detecting a current operating variable of the engine driving force adjusting mechanism; (g) seventh means for deriving an engine torque generated from the engine on the basis of the detected engine revolutional speed and operating variable; (h) eighth means for deriving a running resistance on the basis of the derived engine torque and the current vehicle speed; (i) ninth means for deriving a change in a predetermined factor determining the running resistance on the basis of the derived running resistance and determining whether a current road on which the vehicle cruises at the set cruise speed has a lower frictional coefficient such that slip occur on drive wheels of the vehicle than a predetermined value on the basis of the derived result of the change in the predetermined factor; and (j) tenth means for producing and outputting a zero driving force command to the fourth means so that the engine driving force becomes zero via the engine driving force adjusting mechanism with the output of the speed command to the fourth means by the third means halted according to the result of determination on the current running road having the frictional coefficient by the ninth means.

The above-described object can also be achieved by providing a system for automatically controlling a vehicle speed to a desired cruise speed, comprising: (a) first means for detecting a current vehicle speed; (b) second means through which the current vehicle speed is settable to a cruise speed at which the vehicle is desired to cruise; (c) third means responsive to the cruise speed set through the second means for producing a speed control command to control an engine driving force generated by a vehicular engine so that the current vehicle speed coincides with the set cruise speed; (d) fourth means responsive to the speed control command from the third means for actuating an engine driving force adjusting mechanism; (e) fifth means for detecting an engine revolutional speed; (f) sixth means for detecting a current operating variable of the engine driving force adjusting mechanism; (g) seventh means for deriving an engine torque generated from the engine on the basis of the detected engine revolutional speed and operating variable; (h) eighth means for deriving a running resistance on the basis of the derived engine torque and the current vehicle speed; and (i) ninth means for deriving a change in a predetermined factor determining the running resistance on the basis of the derived running resistance and determining whether a current road on which the vehicle cruises at the set cruise speed has a lower frictional coefficient such that slip occurs on drive wheels of the vehicle than a predetermined value on the basis of the derived result of the change in the predetermined factor; and wherein the third means produces and outputs a zero driving force command to the fourth means so that the engine driving force becomes zero via the engine driving force adjusting mechanism in place of the output of the speed control command when the ninth means determines that the current road has the lower frictional resistance coefficient than the predetermined value on the basis of the derived result of the change in the predetermined factor.

The above-described object can also be achieved by providing a method for automatically controlling a vehicle speed to a desired cruise speed, comprising the steps of: (a) detecting a current vehicle speed; (b) storing the current vehicle speed as a target cruise speed at which the vehicle is desired to cruise through setting means; (c) producing a speed control command to control an engine driving force generated by a vehicular engine so that the current vehicle speed coincides with the stored cruise speed in response to the storage of the current speed carried out in the step (b); (d) actuating an engine driving force adjusting mechanism according to the speed control command; (e) detecting an engine revolutional speed; (f) detecting a current operating variable of the engine driving force adjusting mechanism; (g) deriving an engine torque generated from the vehicular engine on the basis of the detected engine revolutional speed and detected operating variable; (h) deriving a running resistance on the basis of the derived engine torque and current vehicle speed; (i) deriving a change in a predetermined factor determining the running resistance and determining whether a current road on which the vehicle cruises at the stored cruise speed has a lower frictional resistance coefficient such that the slips occur on drive wheels of the vehicle than a predetermined value on the basis of the derived result of the change in the predetermined factor; and (j) producing and outputting a zero driving force command to actuate the engine driving force adjusting mechanism so that the engine driving force becomes zero halting the output of the speed control command carried out in the step (c) according to the result of determination on the current road carried out in the step (i).

BRIEF DESCRIPTION OF THE DRAWINGS

FIGS. 2 (A) and 2 (B) are integrally a flowchart for explaining an operation of the system shown in FIG. 1.

DETAILED DESCRIPTION OF THE PREFERRED EMBODIMENT

Reference will hereinafter be made to the drawings in order to facilitate understanding of the present invention.

Figure 1:
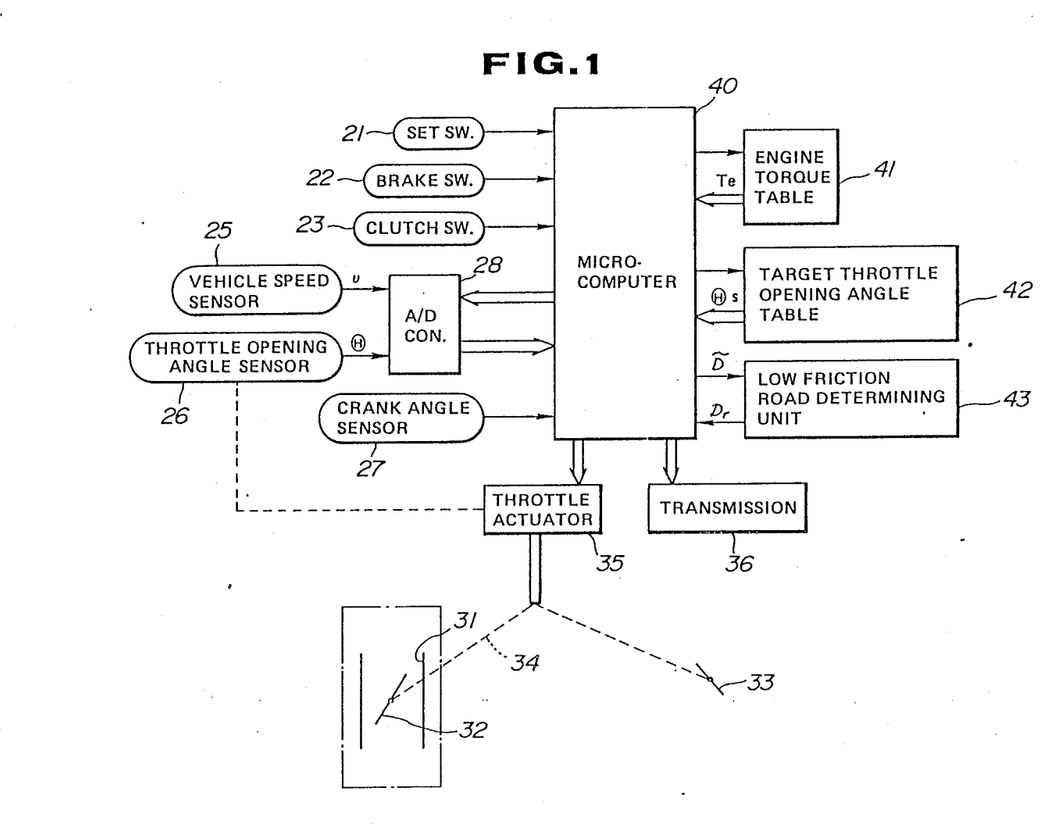
FIG. 1 is a schematic circuit block diagram of a system for automatically controlling a vehicle speed to a desired cruise speed according to the present invention.

FIG. 1 shows a block diagram of a preferred embodiment of a system for automatically controlling a vehicle speed to a desired cruise speed according to the present invention.

The system shown in FIG. 1 is applicable to an automatic transmission mounted vehicle.

As shown in FIG. 1, a set/cruise switch 21 is installed to set the current vehicle speed to a set cruise speed at which the driver desires to cruise driver. A brake switch 22 and an inhibitor switch 23 are installed for inhibiting the operation of the system when a brake pedal is depressed or when shift operation in the automatic transmission occurs. A microcomputer 40 receives a vehicle speed signal v from a vehicle speed sensor 25, an opening angle $\theta$ signal of a throttle valve 32 installed at an intake air passage 31 of a vehicular engine via an analog-to-digital converter 28, and an engine speed signal from a crank angle sensor 27. The microcomputer 40 determines a current friction coefficient of a running road using a friction coefficient determining unit 43. The construction of a throttle actuator is exemplified by a U.S. patent application Ser. No. 169,218 filed on Mar. 16, 1988, the disclosure of which is hereby incorporated by reference. Numeral 33 denotes an accelerator pedal and numeral 36 denotes the transmission, numeral 34 denotes a throttle wire linked to the throttle actuator 35 and accelerator pedal 33.

Figure 2:
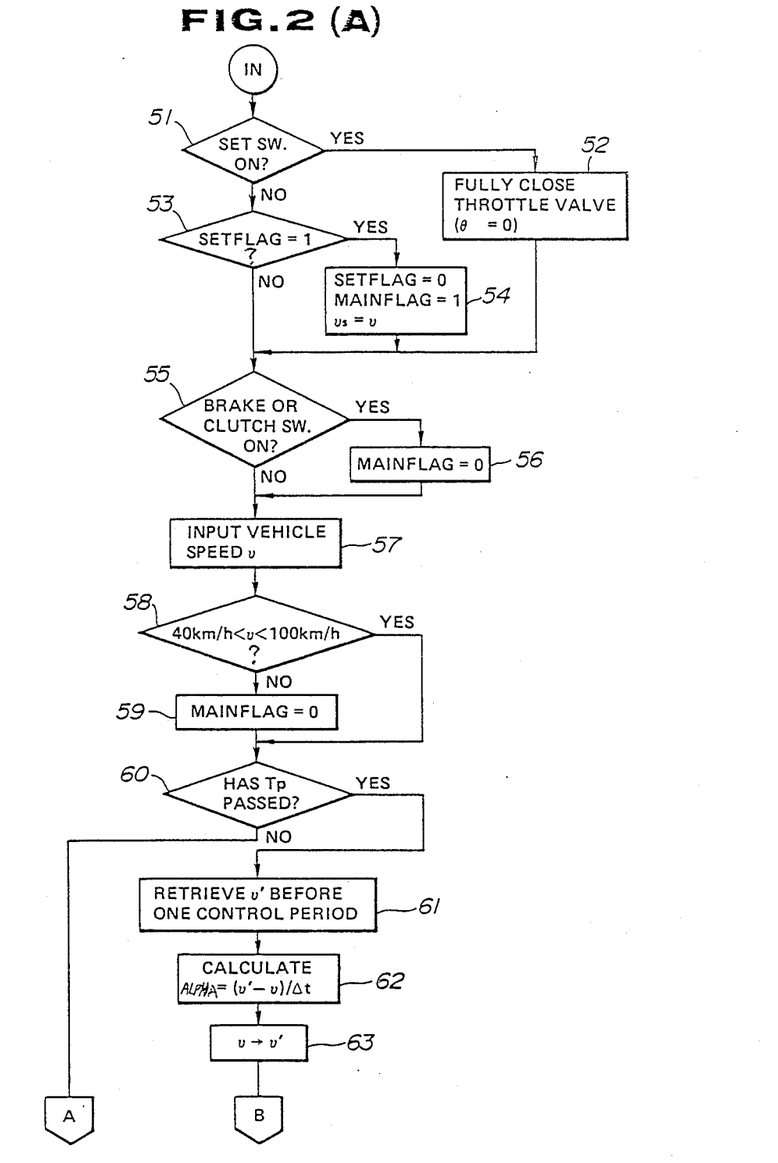

FIGS. 2 (A) to 3 show operational flowcharts executed by the automatic cruise speed controlling system shown in FIG. 1.

Figure 3:
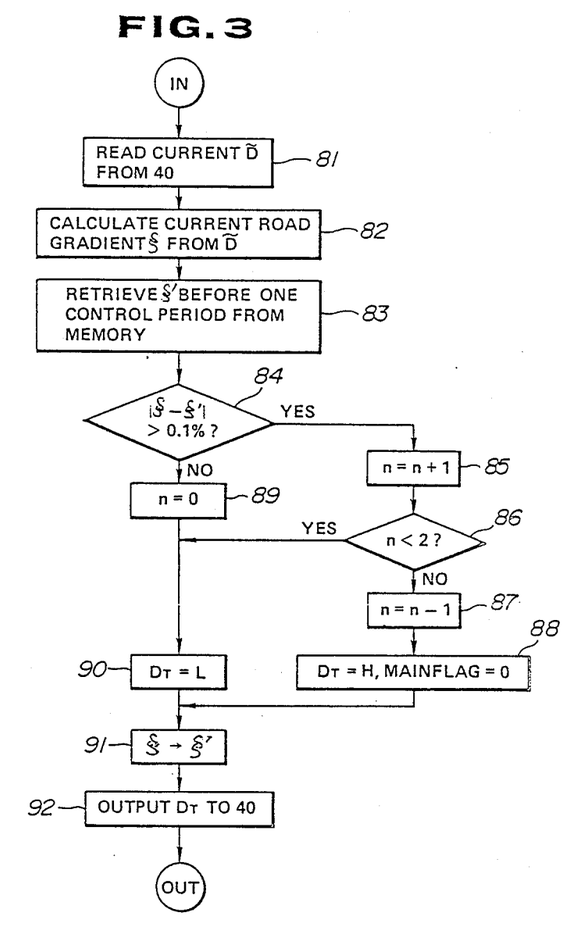
FIG. 3 is an operational flowchart for explaining the operation of the system shown in FIG. 1.

A series of processings shown in FIGS. 2 (A) to 3 are executed for each predetermined period of time (for example, 10 milliseconds).

(i) Start conditions for an automatic cruise speed control and determination for a release condition. (Steps 51 to 54).

The microcomputer 40 determines whether the set/cruise switch 21 is turned on (depressed). If the switch 21 is turned on, a SETFLAG is set to 1 representing the on state of the set/cruise switch 21. Then, the microcomputer issues a throttle actuate command to the actuator 35 to fully close the throttle valve 32.

On the other hand, if the set/cruise switch 21 is turned off and the SETFLAG indicates 1, i.e., immediately after the set/cruise switch 21 is turned off after the turn on, the SETFLAG is set to 0 indicating the set/cruise switch 21 is turned off. Simultaneously, a MAINFLAG is set to 1 indicating that the vehicle is in the cruise control and the current vehicle speed v is set as the target vehicle speed (set cruise speed) $V_s$.

(ii) Determinations for the other release conditions. (Steps 55 to 59).

The other release conditions include cases where the brake switch 22 is turned on, the inhibitor switch 23 (or clutch switch in the case of a manual transmission) is turned on, and the vehicle speed falls out of a predetermined range of speed, e.g., from 40 Km/h to 100 Km/h. In this case, the MAINFLAG is set to 0 indicating that the cruise control by the system shown in FIG. 1 is inhibited.

(iii) Calculation of a vehicle acceleration. (Steps 60 to 63).

After a predetermined period of time ($T_p$ = 10 milliseconds) has elasped and a vehicle speed value v' before one control period of time (10 milliseconds) is retrieved from a memory, the vehicle acceleration ALPHA is calculated in accordance with the following equation (1).

$$ALPHA = (v' - v)/T_p \quad (1)$$

In the step 63, the value of the vehicle speed v is then stored as v' into the memory for the next calculation.

(iv) Estimation of running resistance. (Steps 64 to 66).

The microcomputer 40 measures the opening angle $\theta$ of the engine throttle valve 32 and engine speed Ne from the crank angle sensor 27 and derives the engine torque Te using the engine torque table memory 41 on the basis of the detected values described above.

Figure 4:
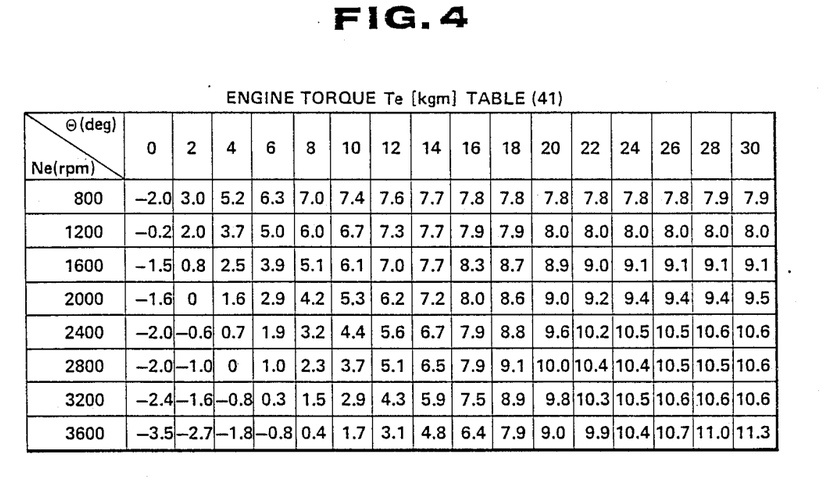
FIG. 4 is a table representing an engine torque of an engine performance stored in a table memory shown in FIG. 1.

An example of contents of the engine torque table memory is shown in FIG. 4.

Hence, the engine torque Te is derived through a table look-up technique using the engine speed Ne and opening angle $\theta$ of the throttle valve.

The following relationship is established between the torque Te, vehicle acceleration ALPHA, shift position m in the transmission 36, and the current running resistance $\sim\tilde{D}$ of the vehicle.

$$Te = (R/r_m n_m r_n r_n) \times [\sim\tilde{D} + (W/g)ALPHA + (J/R^2)ALPHA] \quad (2)$$

In the equation (2), $$J = J_w + r n^2 n_n J_p + (J_r + J_E) r_m^2 r_n^2 n_m n_n \quad (2A)$$

in the equation (2A), $r_m$ denotes a transmission gear ratio of each shift range, $n_m$ denotes a transmission efficiency, $r_n$ denotes a final transmission efficiency, R denotes a tire wheel radius, W denotes a vehicle weight, g denotes a weight acceleration, $J_w$ denotes an inertia moment of a tire wheel, $J_p$ denotes an inertia moment of a pump impeller, $J_r$ denotes an inertia moment of a turbine runner, and $J_E$ denotes an inertia moment of the engine.

From the equation (2), the running resistance is derived as follows.

$$\sim\tilde{D} = (r_m n_m r_n n_n/R)Te - (W/g)ALPHA - (J/R^2)ALPHA \quad (3)$$

As appreciated from the equation (3), the only variables are Te and ALPHA and the other term values are constants inherent to the vehicle provided that $r_m$ and $n_m$ need to be determined according to the value of shift range m. Hence, when the constants are previously given and the values of Te and ALPHA are substituted into the equation (3), the running resistance $\sim\tilde{D}$ can be derived.

(v) Calculation of a target opening angle of the throttle valve. (Step 67).

The engine torque $T\sim\tilde{e}$ required to cruise the vehicle at the target vehicle speed (set cruise speed) $v_s$ against the running resistance $\sim\tilde{D}$ derived from the equation (3) is Te in a case where ALPHA = 0 in the equation (2), i.e., $$T\sim\tilde{e} = (R/r_m n_m r_n n_n) \sim\tilde{D} \quad (4)$$

On the other hand, the engine speed $N\sim\tilde{e}$ present when the vehicle runs at the set cruise speed $v_s$ is derived in the following equation (5).

$$N\sim\tilde{e} = r_m r_n (60/2\pi R)v_s \quad (5)$$

hence, if $T\sim\tilde{e}$ and $N\sim\tilde{e}$ are given, the target opening angle $\theta_s$ is uniformly derived.

Figure 5:
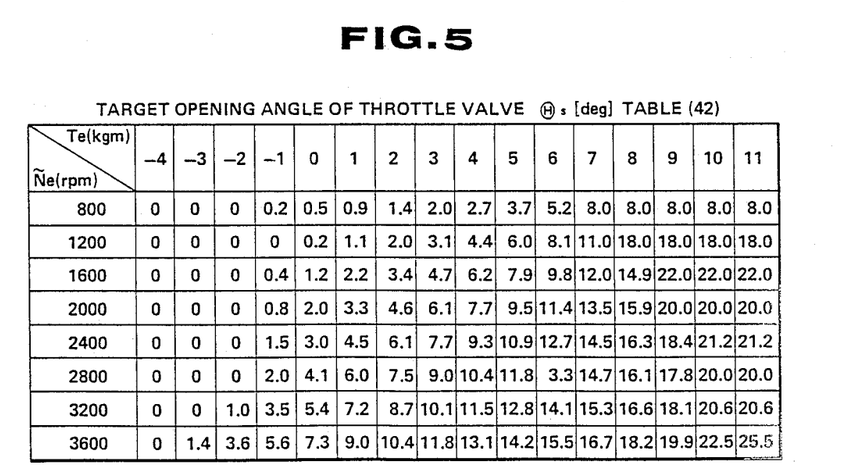
FIG. 5 is a table representing a target opening angle of an engine throttle valve stored in another table memory shown in FIG. 1.

It is noted that the data of the target opening angle $\theta_s$ are stored in the target opening angle table memory 42 and the contents of the target opening angle table memory 42 is exemplified in FIG. 5.

The values of $T\sim\tilde{e}$ and $N\sim\tilde{e}$ derived from the equations (4) and (5) are used to derive the target opening angle $\theta_s$ through a table look-up technique from the table memory 42. The target opening angle $\theta_s$ can thus accurately be derived according to a changing running resistance $\sim\tilde{D}$ with time due to changes in a direction of wind and road gradient. Therefore, the set cruise speed $v_s$ can appropriately be maintained.

(vi) Determination of low frictional road. (Steps 68, 69 in FIG. 2 (B) and steps 81 and 92 in FIG. 3).

The microcomputer 40 and low frictional coefficient determining unit 43 carry out signal transmission and receipt therebetween.

The running resistance $\sim\tilde{D}$ is expressed in the following equation (6) using a road gradient (§) as a factor for determining the running resistance $\sim\tilde{D}$.

$$\sim\tilde{D} = \mu_o W + K S_v^2 + W \sin § \quad (6)$$

In the equation (6), $\mu_o$ denotes a coefficient of a rolling resistance, K denotes a coefficient of air resistance, and S denotes a front surface projecting area.

From the equation (6), the road gradient § is expressed in the following equation (7).

$$§ = \sin^{-1}[(\sim\tilde{D} - \mu_o W - K S_v^2)/W] \quad (7)$$

Hence, § can be derived by substituting $\sim\tilde{D}$ into the equation (7) (step 82).

Next, the road gradient (§') before one control period is read from the memory and the low frictional resistance determining unit 43 determines that the running road is the low frictional road when the absolute value of difference of both road gradients (§ − §') is larger than a predetermined value (for example, 0.1%). The determination of low frictional road is based on an experimental result that although a change in the road gradient for each predetermined control period (for example, 300 msec.) in a normal road having a high road frictional resistance coefficient is minute (about 0.1% or below), the value of § is disturbed if slip occurs and the difference (§−§') exceeds 0.1%.

Hence, if | §−§' | > 0.1%, the determination signal is turned to a high (H) level indicating the low frictional road. (Steps 84, 88).

It is noted that the determination signal from the unit 43 is not immediately turned to H level although | §−§' | > 0.1%. If the number (n) of determinations that | §−§' | > 0.1% becomes equal to or more than 3 (n ≧ 3), the determination signal is turned to the H level.

This is because such a case where the determination signal of H level is provided with a time delay to prevent an errorneuous determination.

On the contrary, if | §−§' | ≦ 0.1%, the unit 43 determines that the current road is not the low frictional road and the determination signal is turned to a low (L) level. (Steps 84, 90).

Finally, the value of § is stored into the memory as §' (§→§') in a step 91.

(vii) Control of a driving force. (Steps 70 to 76).

Returning to FIG. 2 (B), if the determination signal is turned to the L level, the cruise control is carried out. On the contrary, if the determination signal indicates the H level, a so-called driving force null control is carried out.

(vii-a) Cruise control.

In a step 72, since the determination signal indicates the L level and the L level indicates that the current running road is the high frictional road, the microcomputer 40 derives a correction quantity of the operating variable of the throttle valve 32 denoted by delta $\theta$ from the equation (8) using the difference between $v_s$ and $v$.

$$delta\ \theta = g_1(v_s - v) + g_2(\theta_s - \theta) \quad (8)$$

In the equation (8), g1 denotes a speed difference control gain, g2 denotes a throttle opening angle difference control gain, and both g1 and g2 are constants.

A value ($\theta$+ delta $\theta$) which is addition of delta $\theta$ to the previous throttle operating variable of the throttle valve 32 is used as the present operating variable of the throttle valve $\theta$. The value of $\theta$ is outputted to the actuator 35 in a step 73. If delta $\theta$>0, the throttle valve 32 is opened through delta $\theta$. If delta $\theta$ < 0, the throttle valve 32 is closed through | delta $\theta$ |.

It is noted that if the mainflag (MAINFLAG) indicates 0 although the determination signal indicates the L level, the cruise control is released.

(vii-b) Driving force zero control.

In this case, the slip prevention operation should have a higher priority than the cruise control since the current running road is the low frictional road. Therefore, to prevent the occurrence of slips, the driving force generated from the vehicle is to be reduced to a degree not exceeding the road surface frictional force.

In the preferred embodiment, the target opening angle $\theta_s$ is set so that the engine torque Te becomes null. That is to say, using the engine torque table memory 41, the opening angle $\theta$ is derived from the values of Ne and Te (provided that Te = 0) and the value of $\theta$ is set as $\theta_s$ in a step 74.

In a step 75, the microcomputer 40 outputs the operating variable of the throttle valve to the actuator 35 so that $\theta$ is equal to $\theta_s$.

Figure 6:
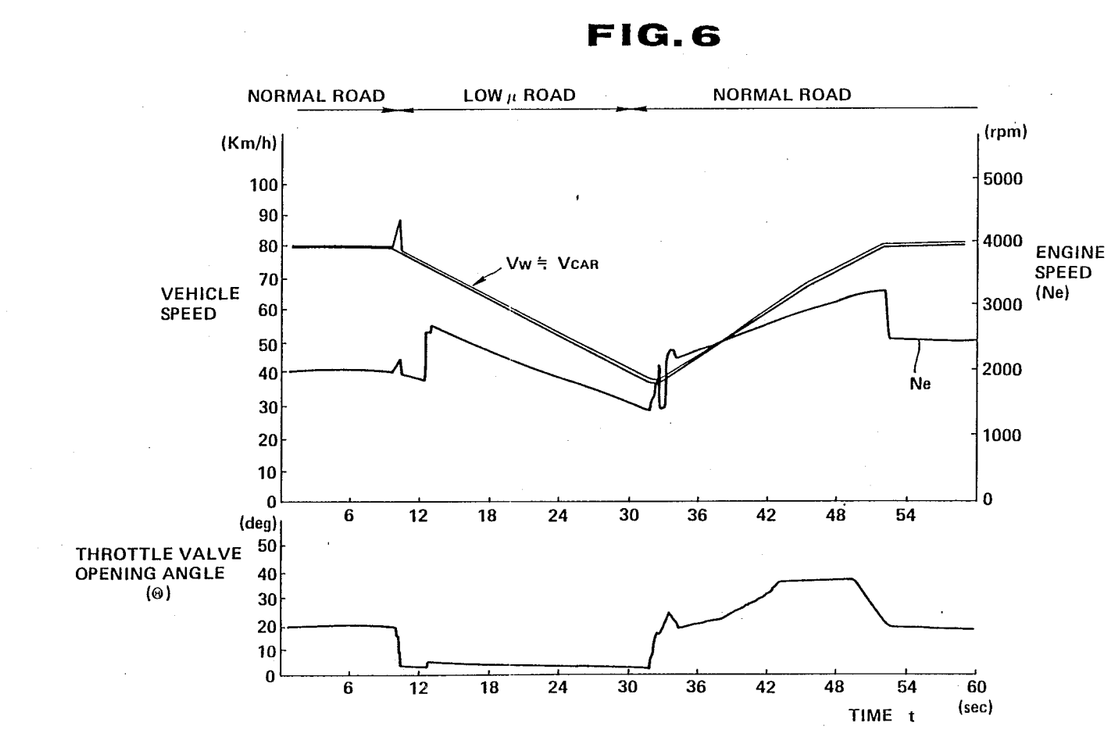
FIG. 6 is a characteristic graph representing a result of operation by the system shown in FIG. 1.

Next, an action of the system and method for automatically controlling the vehicle speed to a desired cruise speed according to the present invention will be described with reference to FIG. 6 when the vehicle enters on low frictional road ($\mu$ = 0.1) and road gradient (3%) during the cruise control operation from the high frictional road.

When the vehicle running on the normal road at the cruise speed (of 80 Km/h) enters at a time t1 (10 seconds) on the low frictional road, the drive wheels slip and then the drive wheel speed $V_w$ is instantaneously larger than the vehicle body speed $V_{car}$ and thereafter the drive wheel speed $V_w$ is again coincident with the vehicle body speed $V_{car}$.

After the unit 43 determines that the current road indicates the low frictional road (steps 82 to 88), the drive wheels torques are reduced to a degree not exceeding the road frictional force until the current road is returned to the normal road at time t2 (30 seconds). Thus a gripping force is returned to the drive wheels (steps 70, 74, and 75).

In other words, since the cruise control operation cannot play its role and slip occurs on a road covered with snow or ice due to its impossibility to maintain the desired cruise speed, the cruise control operation is preferably halted. The system then implements preventive control to prevent the occurrence of to achieve a safety drive on such a low frictional road.

The determination of the low frictional road is based on a change in road gradients (§−§') determining the running resistance (∼D) is adopted and empirical rules teach that a deviation occurs in the change. Hence, if the engine performance data shown in FIGS. 4 and 5 can previously be provided, no sensor for detecting the low frictional road is needed and thus the manufacturing cost of the vehicle is accordingly reduced. If these data are grasped as a drive system model, each kind of vehicle models can be applied whose drive system model is different unless these data are known.

It is noted that when the driver depresses (turns on) a resume switch (not shown in FIG. 1) installed together with the set/cruise switch 21 at a time t3 (32 seconds in FIG. 6) after the passage of the low frictional road, the vehicle speed is returned to the target cruise speed $v_s$.

It is also noted that although the low frictional road determining unit 43 is separately installed in the preferred embodiment as shown in FIG. 1, the microcomputer 40 can play its role. The transmission 36 may be a manual type or another type transmission.

As described hereinabove, since in the system and method for automatically controlling the vehicle speed to the desired vehicle speed means for determining whether the present running road is the low frictional road, on the basis of factors determining the running resistance is provided so that during the determination that the present running road is the low frictional road the driving force generated from the vehicle is zeroed, and the prevention of occurrence of slips on the drive wheels can be assured even if the cruise control operation is carried out during the run on the low frictional road such as a road covered with snow or ice. Then, after the passage of the low frictional road, the tire wheel gripping forces are recovered so that the stability of the vehicle run can accordingly be improved.

It will be fully appreciated by those skilled in the art that the foregoing description is made in terms of the preferred embodiment and various changes and modifications may be made without departing from the scope of the present invention which is to be defined by the appended claims.

What is claimed is:

1. A system for automatically controlling a vehicle speed to a desired cruise speed, comprising:
   (a) first means for detecting a current vehicle speed;
   (b) second means through which the current vehicle speed is set as a cruise speed at which the vehicle is desired to cruise;
   (c) third means responsive to the cruise speed set through the second means for producing a speed control command to control an engine driving force generated by a vehicular engine so that the current vehicle speed coincides with the set cruise speed;
   (d) fourth means responsive to the speed control command from the third means for actuating an engine driving force adjusting mechanism;
   (e) fifth means for detecting an engine revolutional speed;
   (f) sixth means for detecting a current operating variable of the engine driving force adjusting mechanism;
   (g) seventh means for deriving an engine torque generated from the engine on the basis of the detected engine revolutional speed and the current operating variable;
   (h) eighth means for deriving a running resistance on the basis of the derived engine torque and the current vehicle speed;
   (i) ninth means for deriving a change in a predetermined factor determining the running resistance on the basis of the derived running resistance and determining, on the basis of the derived result of the change in the predetermined factor, whether a current road on which the vehicle cruises at the set cruise speed has a lower frictional coefficient than a predetermined value at which slips occur on drive wheels of the vehicle; and
   (j) tenth means for producing an outputting a zero driving force command to the fourth means so that the engine driving force becomes zero via the engine driving force adjusting mechanism with the output of the speed command to the fourth means by the third means being halted according to the result determined by the ninth means.

2. A system as set forth in claim 1, wherein the tenth means derives a target operating variable of the engine driving force adjusting mechanism on the basis of a zero engine torque and the detected engine revolution speed and produces and outputs the zero driving force command representing a difference between the current operating variable and the target operating variable to the fourth means and the fourth means actuates the engine driving force adjusting mechanism so that the engine driving force becomes zero, when the ninth means determines that the current road has a lower frictional coefficient than the predetermined value.

3. A system as set forth in claim 1, which further comprises: (a) eleventh means for deriving a target operating variable through which the vehicle can cruise at the set cruise speed on the basis of the running resistance derived by the eighth means; and (b) twelfth means for deriving a speed difference between the current vehicle speed detected by the first means and the set cruise speed through the second means and wherein the third means produces the speed control command representing a difference between the current operating variable and the target operating variable based on the speed difference derived by the eleventh means and the difference derived by the twelfth means and outputs the speed control command to the fourth means when the ninth means determines that the current road has a frictional coefficient that is not lower than the predetermined value.

4. A system for automatically controlling a vehicle speed to a desired cruise speed, comprising:
   (a) first means for detecting a current vehicle speed;
   (b) second means through which the current vehicle speed is set as a cruise speed at which the vehicle is desired to cruise;
   (c) thirds means responsive to the cruise speed set through the second means for producing a speed control command to control an engine driving force generated by a vehicular engine so that the current vehicle speed coincides with the set cruise speed;
   (d) fourth means responsive to the speed control command from the third means for actuating an engine driving force adjusting mechanism;
   (e) fifth means for detecting an engine revolutional speed;
   (f) sixth means for detecting a current operating variable of the engine driving force adjusting mechanism;
   (g) seventh means for deriving an engine torque generated from the engine on the basis of the detected engine revolutional speed and the current operating variable;
   (h) eighth means for deriving a running resistance on the basis of the derived engine torque and the current vehicle speed; and
   (i) ninth means for deriving a change in a predetermined factor determining the running resistance on the basis of the derived running resistance and determining, on the basis of the derived result of the change in the predetermined factor, whether a current road on which the vehicle cruises at the set cruise speed has a lower frictional coefficient than a predetermined value at which slips occur on drive wheels of the vehicle;
   and wherein the third means produces and outputs a zero driving force command to the fourth means so that the engine driving force becomes zero via the engine driving force adjusting mechanism in place of the output of the speed control command when the ninth means determines that the current road has a lower frictional resistance coefficient than the predetermined value.

5. A system as set forth in claim 4, which further comprises:
   (a) tenth means for deriving a change rate of the vehicle speed with time on the basis of the current vehicle speed and a previous vehicle speed one predetermined control period before; and
   (b) eleventh means for detecting a current gear shift range of a vehicular transmission,
   and wherein the eighth means derives the running resistance on the basis of the derived change rate of the vehicle speed with time, the derived gear shift range, and the engine torque derived by the seventh means.

6. A system as set forth in claim 5, wherein the third means includes:
   (a) twelfth means for deriving the engine torque through which the vehicle cruises at the set cruise speed on the basis of the running resistance derived by the eighth means and a zero change rate of the vehicle speed with time;

(b) thirteenth means for deriving the engine revolutional speed through which the vehicle cruises at the set cruise speed on the basis of the set cruise speed;

(c) fourteenth means for deriving a target operating variable of the engine driving force adjusting mechanism from the engine torque derived by the twelfth means and the engine revolutional speed derived by the thirteenth means; and (d) fifteenth means for deriving a speed difference between the set cruise speed and the current vehicle speed and an operating variable difference between the target operating variable and the current operating variable; and (e) sixteenth means for producing and outputting a speed control command indicating a correction quantity of a difference between the target operating variable and current operating variable.

7. A system as set forth in claim 6, wherein the third means produces and outputs the zero driving force command representing the difference between the target operating variable and current operating variable of the engine driving force adjusting mechanism, the target operating variable being derived by the fourteenth means with the engine torque being zeroed.

8. A system as set forth in claim 7, wherein the predetermined factor determining the running resistance is a road gradient and the ninth means derives an absolute value of a difference between the current road gradient derived from the running resistance derived by the eighth means and a previous road gradient one predetermined calculation period before, compares the absolute value of the difference with a predetermined value of a threshold determining that the current road has the frictional coefficient below which the current road has a low frictional resistance coefficient, and produces a first determination signal indicating that the absolute value of the difference exceeds the predetermined value of the threshold.

9. A system as set forth in claim 8, wherein the ninth means determines that the current road has a lower frictional coefficient than the predetermined value when the first determination signal is produced for a predetermined number of times.

10. A system as set forth in claim 8, wherein the ninth means produces a second determination signal when the absolute value of the difference is equal to or below the predetermined value of the threshold value.

11. A system as set forth in claim 10, wherein, when the ninth means produces the second determination signal, the third means produces and outputs the speed control command to the fourth means.

12. A system as set forth in claim 8, wherein the predetermined calculation period is 300 milliseconds.

13. A system as set forth in claim 8, wherein the predetermined value of the threshold value is 0.1%.

14. A system as set forth in claim 4, wherein the seventh means includes a table memory representing a table indicating a graph of the engine torque having a relationship between the engine torque, engine revolutional speed, and the current operating variable of the engine driving force adjusting mechanism.

15. A system as set forth in claim 5, wherein the eighth means derives the running resistance using a table memory representing a relationship expressed below;

$$\sim D = (r_m n_m r_n n_n/R) T_e - (W/g) ALPHA - (J/R^2) ALPHA$$

wherein ALPHA denotes the change rate of the vehicle speed with time, $r_m$ denotes a gear ratio of each gear shift range, $n_m$ denotes a transmission efficiency of each gear shift range, $r_n$ denotes a final gear reduction ratio, $n_m$ denotes a final transmission efficiency, R denotes a radius of each tire wheel, W denotes a vehicle weight, g denotes a gravational acceleration, $T_e$ denotes the engine torque, and J is expressed as follows: $J = J_w + r_n^2 n_n J_p + (J_r + J_E) r_m^2 r_n^2 n_m n_n$, wherein $J_w$ denotes an inertia moment of a tire wheel, $J_p$ denotes an inertia moment of a pump impeller, $J_T$ denotes an inertia moment of a turbine runner, and $J_E$ denotes an inertia moment of the vehicular engine, and wherein the values of the variables in the equations except $T_e$ and ALPHA are previously determined.

16. A system as set forth in claim 6, wherein the thirteenth means derives the engine revolutional speed from the following equation, $\sim N_e = r_m r_n (60/2 \pi R) v_s$, wherein $r_m$ denotes a gear reduction ratio of each gear shift range, $r_n$ denotes a final reduction gear ratio, and $v_s$ denotes the set cruise speed.

17. A system as set forth in claim 9, wherein the predetermined number of times is three.

18. A system as set forth in claim 4, wherein the engine driving force adjusting mechanism is an engine throttle valve installed in an intake air passage and the current operating variable is an opening angle of the throttle valve.

19. A system as set forth in claim 8, wherein the road gradient is derived using the following equation; $\S = \sin^{-1} [(\sim \tilde{D} - \mu_o W - K S v^2) / W]$, wherein $\sim \tilde{D}$ denotes the running resistance, $\mu_o$ denotes a vehicular rolling resistance coefficient, K denotes an air resistance coefficient, W denotes a vehicle weight, S denotes a vehicular front surface projecting area, and v denotes the current vehicle speed.

20. A method for automatically controlling a vehicle speed to a desired cruise speed, comprising the steps of:

(a) detecting a current vehicle speed;

(b) storing, through a setting means, the current vehicle speed as a target cruise speed at which the vehicle is desired to cruise;

(c) producing a speed control command to control an engine driving force generated by a vehicular engine so that the current vehicle speed coincides with the stored cruise speed in response to the storage of the current speed carried out in the step (b);

(d) actuating an engine driving force adjusting mechanism according to the speed control command;

(e) detecting an engine revolutional speed;

(f) detecting a current operating variable of the engine driving force adjusting mechanism;

(g) deriving an engine torque generated from the vehicular engine on the basis of the detected engine revolutional speed and the detected current operating variable;

(h) deriving a running resistance on the basis of the derived engine torque and current vehicle speed;

(i) deriving a change in a predetermined factor determining the running resistance and determining, on the basis of the derived result of the change in the predetermined factor, whether a current road on which the vehicle cruises at the stored cruise speed has a lower frictional resistance coefficient than a predetermined value at which slips occur on drive wheels of the vehicle; and (j) producing and outputting a zero driving force command to actuate the engine driving force adjusting mechanism so that the engine driving force becomes zero by halting the output of the speed control command carried out in the step (c) according to the result of determination carried out in the step (i).

* * * * *